Figure 1:
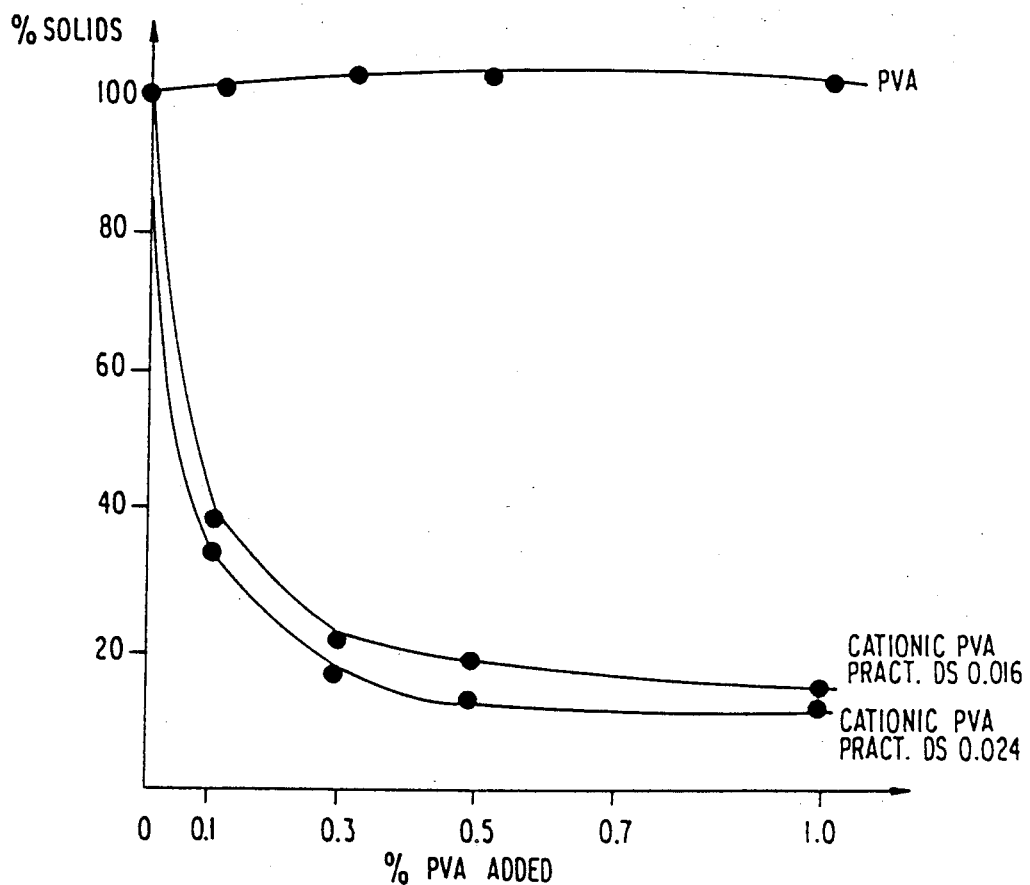

United States Patent [19]

Stober et al.

[11] Patent Number: 5,001,191

[45] Date of Patent: * Mar. 19, 1991

[54] PROCESS FOR DRY CATIONIZATION OF POLYVINYL ALCOHOL

[75] Inventors: Reinhard Stober, Hasselroth; Dietmar Bischoff, Alzenau-Michelbach; Ellen Kohn, Grossaitigen, all of Fed. Rep. of Germany

[73] Assignee: Degussa Aktiengesellschaft, Frankfurt, Fed. Rep. of Germany

[*] Notice: The portion of the term of this patent subsequent to Apr. 18, 2006 has been disclaimed.

[21] Appl. No.: 438,070

[22] Filed: Nov. 20, 1989

Related U.S. Application Data

[63] Continuation-in-part of Ser. No. 318,692, Mar. 3, 1989, abandoned, which is a continuation of Ser. No. 947,179, Dec. 29, 1986, Pat. No. 4,822,851.

[30] Foreign Application Priority Data

Aug. 7, 1986 [DE]  Fed. Rep. of Germany ....... 3626662

[51] Int. Cl.$^5$ .............................................. C08F 8/00
[52] U.S. Cl. ....................................... 525/61; 525/62; 525/374
[58] Field of Search ............................ 525/61, 62, 374

[56] References Cited

U.S. PATENT DOCUMENTS

| | | | |
|---|---|---|---|
| 3,121,607 | 2/1964 | Ohno et al. ............... | 525/61 |
| 3,684,784 | 8/1972 | Marze ....................... | 525/61 |
| 3,685,953 | 8/1972 | Curelier .................... | 8/115 |
| 3,959,406 | 5/1976 | Tsuji et al. ................ | 525/61 |
| 4,109,068 | 8/1978 | Allen ......................... | 525/61 |
| 4,127,563 | 11/1978 | Rankin et al. ............. | 536/50 |
| 4,182,804 | 1/1980 | Serboli et al. ............. | 525/61 |
| 4,281,109 | 7/1981 | Jarowenko et al. ........ | 536/50 |
| 4,308,189 | 12/1981 | Moritani et al. ........... | 525/59 X |
| 4,311,805 | 1/1982 | Moritani et al. ........... | 525/61 X |
| 4,567,221 | 1/1986 | Maruyama et al. ........ | 525/61 X |
| 4,645,794 | 2/1987 | Davis et al. ................ | 525/61 |

FOREIGN PATENT DOCUMENTS

| | | | |
|---|---|---|---|
| 2396790 | 3/1979 | France ................. | 525/60 |
| 0037032 | 11/1970 | Japan .................. | 525/62 |
| 0003689 | 1/1977 | Japan .................. | 525/62 |
| 0135202 | 8/1984 | Japan .................. | 525/60 |
| 1041396 | 2/1986 | Japan .................. | 525/60 |
| 0174648 | 9/1965 | U.S.S.R. ............. | 525/62 |

Primary Examiner—Joseph L. Schofer
Assistant Examiner—J. M. Reddick
Attorney, Agent, or Firm—Beveridge, DeGrandi & Weilacher

[57] ABSTRACT

A process for the dry cationization of polyvinyl alcohol (PVA) by reaction of alkylidene epoxides with PVA in alkaline medium in the presence of water, in which the reaction mixture contains 11 to 30 weight % of water, based on its total amount, and 1 to 4 weight % of an alkali metal or alkaline earth metal hydroxide or alkaline earth metal oxide, based on the quantity of PVA. As the cationizing agent there are used alkylidene epoxides or their mixtures having the general formula:

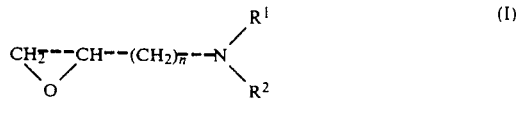

or

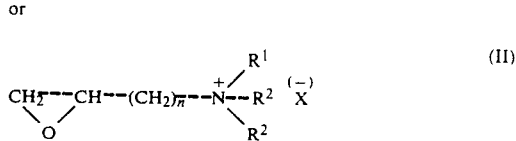

wherein n = 1, 2 or, 3, $R^1$, $R^2$ and $R^3$ represent the same or different alkyl residues having 1 to 18 carbon atoms or $R^1$ represents the benzyl or $-C_2H_4OH$, and $X^-$ denotes chloride, bromide, sulfate or acetate. Instead of alkylidene epoxides, the corresponding halohydrins, e.g. chlorohydrin or bromohydrin, can be used.

16 Claims, 1 Drawing Sheet

DEPENDENCE OF THE SOLIDS CONTENT IN THE DEWATERING
FILTRATE ON THE QUANTITY OF POLYVINYL ALCOHOL ADDED
TO THE MASS

PROCESS FOR DRY CATIONIZATION OF POLYVINYL ALCOHOL

This application is a continuation-in-part application of Ser. No. 07/318,692 filed Mar. 3, 1989, now abandoned, which is a continuation of Ser. No. 06/947,179 filed Dec. 29, 1986, now U.S. Pat. No. 4,822,851.

The invention relates to a process for the preparation of cationized polyvinyl alcohol (PVA) by reaction of PVA with alkylidene epoxides.

A reaction of this kind is known from Japanese application No. 77/03689 (C.A. 86, 141243n), where PVA is digested in aqueous sodium hydroxide solution, then the excess sodium hydroxide solution is removed by filtration and the wet filter cake obtained is allowed to react with 2,3-epoxypropyl trimethylammonium chloride during several hours of thorough mixing.

The considerable excess of alkali in the reaction product must be neutralized with acetic acid, and the intermediate product thus obtained must then be washed with methanol and dried.

Cationized polyvinyl alcohols find application in the manufacture of paper, e.g. for improvement of the retention behavior, and also lead to an improvement in the strength properties of the finished paper.

The object of the invention is to provide a process for the preparation of cationized polyvinyl alcohols which leads to the final product directly without intermediate steps.

A process for the preparation of cationized polyvinyl alcohols (PVA) has now been found in which PVA is reacted with alkylidene epoxides in alkaline medium in the presence of water, which is characterized by the fact that the reaction is carried out in the presence of 11 to 30 weight %, based on the total amount of the reaction mixture, and 1 to 4 weight %, preferably 2.5 to 3.1 weight %, of an alkali or alkaline earth hydroxide or alkaline earth oxide, based on the quantity of PVA.

The reaction temperature range ranges from 5° to 75° C., especially from 15° to 45° C.

The invention is further described below with reference to the drawing which is a graph of percent solids vs. PVA added.

In a preferred embodiment, the procedure is carried out in such a way that the mixture of PVA, alkali metal or alkaline earth metal hydroxide or alkaline earth metal oxide, alkylidene epoxide and water is homogenized in a mixing zone provided by an intensive mixer for 10 seconds to 25 minutes, preferably 20 seconds to 5 minutes, then the mixture is discharged therefrom and the cationization reaction is allowed to proceed to completion.

Further mixing energy and additional process steps are then no longer required.

If a rapid reaction is desired, the mixer and the reaction vessel in which the remaining reaction takes place are heated to the temperatures of up to 75° C.

It is likewise possible only to heat the mixer, and to permit the remaining reaction to proceed, without further effort at heating, at room temperature (20° to 25° C.), or vice versa.

Preferably one operates at the temperature which is arrived at in the mixer without external input of heat (18° to 30° C.), preferably 20°-25° C.), and after homogenization the mixture is at once placed in a shipping container or in a silo, or other convenient storage and the cationization reaction is allowed to proceed to completion at the temperature which is reached depending on the temperature of the surroundings or room temperature. Depending on seasonally induced variations, this is 18° to 30° C. and particularly 20° to 25° C.

The short residence time in the mixing unit thus also permits the dry cationization to be carried out continuously.

Suitable intensive mixers are e.g. plowshare mixers (continuous and discontinuous) and moistening flow-through mixers (continuous). Any suitable intensive mixer can be used.

The sequence of addition of reagents to the PVA, already present in the reaction zone, is not critical for success. In general, the procedure is carried out in such a way that the hydroxide or oxide used for alkalization is in the form of an aqueous solution, aqueous suspension or as a solid is dropped into the PVA already present, or preferably is sprayed into the reaction zone within 10 sec to 5 min; subsequently the cationization agent and optionally additional water are preferably sprayed therein.

The duration time given above for the homogenization begins with the metering in of the cationization agent. However, it is also possible instead to add all components to the PVA at the same time.

In accordance with the invention, the etherification of the PVA is carried out with an alkylidene epoxide or mixtures of these epoxides having the general formula:

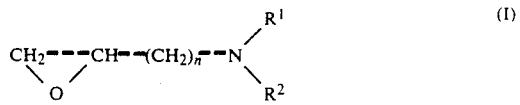

or preferably

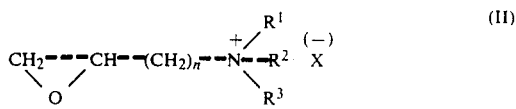

in which n is a number from 1 to 3 and $R^1$, $R^2$ and $R^3$ denote the same or different alkyl residues having 1 to 18 carbon atoms or $R^1$ denotes benzyl or $C_2H_4OH$ and $X^{(-)}$ is chloride, bromide, sulfate or acetate, and especially chloride.

Instead of the alkylidene epoxides, the corresponding halohydrins, e.g. chlorohydrin or bromohydrin, can be used; in that case the conversion to the epoxides corresponding to the formulas (I) and (II), which react with the PVA, occurs at the latest in the reaction medium. Here it is indeed necessary to use, besides the catalytic quantity of alkali, an additional stoichiometric quantity of alkali for the conversion of the halohydrin, e.g. chlorohydrin, to the epoxide. Thus, there is an excess of 1 to 4 weight % alkali, based on the quantity of PVA, over the amount of alkali required to completely convert the halohydrin to the epoxide. See Examples 4 and 4a infra.

Polyvinyl alcohols suitable as starting materials for purposes of the invention are those with a high saponification number, preferably 99% hydrolyzed, having a degree of polymerization preferably from ca. 2000 to 2400, which are in particulate, free-flowing form. PVA can be used both in granular as well as in powder form. Especially suitable polyvinyl alcohols are those which exist in the form of powders.

The PVA remains free-flowing and even after the reaction it no longer has to be dried.

Neutralization of the final product is likewise unnecessary.

For each hydroxyl group in the polyvinyl alcohol, there is used 0.005 to 1 mole of epoxide in accordance with formulas (I) and (II), preferably 0.05 to 0.2 moles of epoxide. This results in a degree of substitution (DS) of 0.005 to 1, or of 0.05 to 0.2, respectively.

In accordance with the invention, the etherification of PVA with the alkylidene epoxides is carried out in a medium which contains 11 to 30 weight %, especially 12 to 20 weight %, of water, based on the total amount of the reaction mixture, and 1 to 4 weight %, especially 2.5 to 3.1 weight %, of an alkali metal or alkaline earth metal hydroxide or oxide, based on the quantity of PVA, especially sodium hydroxide. The most favorable value for the sodium hydroxide concentration is between 2.9 and 3.1 weight %, and is especially 3.0 weight %.

The hydroxides or oxides which effect alkalization are used in the form of aqueous solutions, suspensions or as solids. Their water content is adjusted in such a way that the minimum quantity of water, in the amount of 11 weight %, needed for the reaction is reached or exceeded, naturally while taking into account the quantities of water introduced via the epoxide solution.

Along with these components that are known in the art, in one variant of the process that is employed 0.02 to 2.0 weight %, preferably 0.2 to 1.0 weight %, of a finely divided silica, based on the total amount of the reaction mixture.

This finely divided, synthetically produced silica may be precipitated silica or one produced by flame hydrolysis, hydrophilic or hydrophobic and mixtures thereof.

The specific surface areas of the silica used in this invention are between 60 and 700 $m^2/g$, preferably 100 and 450 $m^2/g$ (BET measurement according to German Standards Institute method DIN 66 131, $N_2$ adsorption at the temperature of liquid nitrogen, with previous heating of the sample at 110° C.).

It is preferred to use hydrophilic precipitated silicas having a specific surface area of 190 to 450 $m^2/g$, especially a spray dried precipitated silica having a specific surface area of 190 $m^2/g$ (BET measurement).

Mixtures of hydrophobic and hydrophilic silicas are also used.

The following examples are illustrative of the present invention.

EXAMPLE 1

A 4 L plowshare mixer is first charged with 10 moles of PVA granules (Mowiol® 28-99). With the mixer turning (3000 rpm), 3% NaOH (based on the dry PVA) as a 30% solution is added dropwise within a 5 minute period. After 5 min more, 0.2 mole of 2,3-epoxypropyl-trimethylammonium chloride (active content 71.15%) and the necessary quantity of water are added and mixing continued for 10 min longer. The quantity of water is determined in such a way that the water content indicated in Table 1 or Table 2 is reached.

After this, the reaction mixture is transferred to a plastic bag, sealed vacuum tight and then stored at the desired reaction temperature.

The results are shown in Tables 1 and 2.

TABLE 1

Dry cationization of PVA (Mowiol 28-99): Viscosity (DIN 53015): 28 ± 2 mPA's; Degree of saponification 99.4 mole %

| Experiment No | DS theo | Water Content | Catalyst | Temperature (°C.) | Time (h) | % Nitrogen | DS Pract | Yield (%) |
|---|---|---|---|---|---|---|---|---|
| 1 | 0.02 | 33.7 | 3% NaOH | 45° | 7 | 0.2146 | 0.0069 | 34.6 |
|  |  |  |  |  | 30 | 0.2519 | 0.0081 | 40.7 |
| 2 | 0.02 | 22.6 | 3% NaOH | 45 | 7 | 0.2519 | 0.0081 | 40.7 |
|  |  |  |  |  | 30 | 0.2711 | 0.0088 | 43.9 |
| 3 | 0.02 | 17.4 | 3% NaOH | 45 | 7 | 0.2658 | 0.0086 | 43.1 |
|  |  |  |  |  | 30 | 0.2818 | 0.0091 | 45.7 |
| 4 | 0.02 | 17.4 | 3% NaOH | 25 | 48 | 0.1499 | 0.0048 | 23.0 |
|  |  |  |  |  | 72 | 0.1881 | 0.0060 | 30.2 |
|  |  |  |  |  | 168 | 0.2719 | 0.0088 | 44.1 |
| 5 | 0.02 | 17.4 | 3% NaOH | 75 | 4 | 0.2652 | 0.0086 | 42.9 |

TABLE 2

Dry Cationization of PVA (Mowiol 28-99)

| Experiment No | DS theo | Water Content | Catalyst | Temperature (°C.) | Time (h) | % Nitrogen | DS Pract | Yield (%) |
|---|---|---|---|---|---|---|---|---|
| 6 | 0.02 | 17.4 | 4% NaOH | 25 | 48 | 0.1398 | 0.0045 | 22.3 |
|  |  |  |  |  | 168 | 0.2500 | 0.0081 | 40.4 |
| 7 | 0.02 | 17.4 | 4% NaOH | 45 | 4 | 0.1826 | 0.0059 | 29.0 |
|  |  |  |  |  | 24 | 0.2511 | 0.0081 | 40.6 |
| 8 | 0.02 | 17.4 | 4% NaOH | 75 | 1 | 0.2511 | 0.0081 | 40.6 |
| 9 | 0.02 | 17.4 | 2% NaOH | 25 | 48 | 0.1420 | 0.0045 | 22.7 |
|  |  |  |  |  | 168 | 0.2218 | 0.0072 | 35.8 |
| 10 | 0.02 | 17.4 | 2% NaOH | 45 | 4 | 0.2146 | 0.0069 | 34.5 |
|  |  |  |  |  | 24 | 0.2270 | 0.0073 | 36.6 |
| 11 | 0.02 | 17.4 | 2% NaOH | 75 | 1 | 0.2136 | 0.0069 | 34.5 |
|  |  |  |  |  | 4 | 0.2198 | 0.0071 | 35.4 |

EXAMPLE 2

Following the procedure of Example 1, Elvanol® 71-30 is used in place of Mowiol 28-99. The results can be seen in Table 3. In experiment Nos. 15 to 19, 0.6 mole of 2,3-epoxytrimethylammonium chloride was used, and in No. 20, 1.0 mole of this compound was used.

EXAMPLE 3

In accordance with Example 2, 0.75% (based on PVA) of a finely divided silica was added before the addition of the NaOH or Ca(OH)$_2$.

The quantity of epoxide was chosen in keeping with the various DS values.

In experiment Nos. 21 to 28, Ca(OH)$_2$ was used as catalyst in place of NaOH.

The results are set forth in Table 4.

Analysis

In each case, about 20 g of the reaction sample is withdrawn for analysis and dispersed in 200 g of a 4.1 acetone/water mixture, adjusted from pH 14 to pH 4 with 10% hydrochloric acid, and filtered. After two washings with 200 g portions of acetone/water, the material is filtered with a good vacuum and the filter cake is dried 4 hours at 75° C. The degree of reaction is determined by means of a Kjeldahl nitrogen analysis.

The yield can be expressed as the ratio of the nitrogen content found to the theoretical nitrogen content. It must be taken into account that the non-cationized polyvinyl alcohol may have a baseline nitrogen content, which must be subtracted from the nitrogen content found.

$$\% \text{YIELD} = \frac{(\%N_f - \%N_o)}{\%N_{th}} \times 100$$

$\%N_f$ = nitrogen content found
$\%N_{th}$ = theoretically calculated nitrogen content
$\%N_o$ = baseline nitrogen content of the polyvinyl alcohol $$\%N_f = (V \times 0.14)/E$$

V = consumption of HCl solution in the titration of the Kjeldahl nitrogen determination (mL)
E = dry weight of the cationic PVA used (g)

$$\%N_{th} = \frac{M_{Nt}}{m_{cat.PVA}} \times 100$$

$m_{Nt}$ = mass of nitrogen calculated for a given theoretical DS
$m_{cat.PVA}$ = mass of reaction product calcined for a given theoretical DS.

An additional possibility resides in expressing the yield as the ratio of the practical and the theoretical degree of substitution:

$$\% \text{Yield} = \frac{\text{practical } DS}{\text{theoretical } DS}$$

Calculation of the practical DS:

$$\text{pract. } DS = \frac{(N_f - \%N_o) \times 44.05 \text{ g/mole}}{(14 \text{ g/mole} \times 100) - (\%N_f - \%N_o) \times 151.64 \text{ g/mole}}$$

44.05 5/mole DS = molecular weight per PVA unit

TABLE 3

Dry cationization of PVA (Elvanol 71-30): Viscosity 27-33 mPA's; (4% Aqueous Solution, 20° C.); degree of saponification 99.4–99.8

| Experiment No | DS theo | Water Content | Catalyst | Temperature (°C.) | Time (h) | % Nitrogen | DS Pract | Yield (%) |
|---|---|---|---|---|---|---|---|---|
| 12 | 0.02 | 17.4 | 3% NaOH | 25 | 48 | 0.0799 | 0.0025 | 12.7 |
|  |  |  |  |  | 96 | 0.2891 | 0.0094 | 47.0 |
| 13 | 0.02 | 17.4 | 3% NaOH | 45 | 7 | 0.2811 | 0.0091 | 45.9 |
|  |  |  |  |  | 24 | 0.2875 | 0.0093 | 46.6 |
| 14 | 0.02 | 17.4 | 3% NaOH | 75 | 1 | 0.2766 | 0.090 | 44.9 |
|  |  |  |  |  | 4 | 0.2748 | 0.0089 | 44.5 |
| 15 | 0.06 | 12.0 | 3% NaOH | 25 | 48 | 0.4713 | 0.0156 | 26.1 |
|  |  |  |  |  | 96 | 0.5410 | 0.0181 | 30.1 |
|  |  |  |  |  | 168 | 0.5701 | 0.0191 | 31.9 |
| 16 | 0.06 | 12.0 | 3% NaOH | 45 | 7 | 0.5879 | 0.0198 | 32.9 |
|  |  |  |  |  | 24 | 0.5955 | 0.0200 | 33.4 |
| 17 | 0.06 | 12.0 | 3% NaOH | 75 | 1 | 0.4850 | 0.0161 | 26.8 |
|  |  |  |  |  | 4 | 0.4898 | 0.0163 | 27.1 |
| 18 | 0.06 | 24.5 | 3% NaOH | 25 | 48 | 0.4342 | 0.0143 | 23.9 |
|  |  |  |  |  | 96 | 0.5212 | 0.0174 | 29.0 |
|  |  |  |  |  | 168 | 0.5380 | 0.0180 | 30.0 |
| 19 | 0.06 | 24.5 | 3% NaOH | 45 | 7 | 0.5697 | 0.0191 | 31.8 |
|  |  |  |  |  | 24 | 0.5712 | 0.0192 | 31.9 |
| 20 | 0.1 | 17.4 | 3% NaOH | 75 | 1 | 0.6989 | 0.0238 | 23.8 |

TABLE 4

Dry Cationization of PVA (Elvanol 71-30) in the Presence of 0.75% of Silica (Spray-Dried), Hydrophilic, 190 M$^2$/g)

| Experiment No | DS theo | Water Content | Catalyst | Temperature (°C.) | Time (h) | % Nitrogen | DS Pract | Yield (%) |
|---|---|---|---|---|---|---|---|---|
| 21 | 0.04 | 17.6 | 3% NaOH | 25 | 168 | 0.6455 | 0.0218 | 54.4 |
| 22 | 0.1 | 12.0 | 3% NaOH | 25 | 168 | 1.8379 | 0.0722 | 72.2 |
| 23 | 0.02 | 18.7 | 2% Ca(OH)$_2$ | 25 | 168 | 0.1929 | 0.0062 | 31.2 |
| 24 | 0.02 | 18.7 | 2% Ca(OH)$_2$ | 25 | 168 | 0.2051 | 0.0066 | 32.8 |
| 25 | 0.02 | 18.7 | 2% Ca(OH)$_2$ | 25 | 168 | 0.2021 | 0.0065 | 32.3 |
| 26 | 0.04 | 16.8 | 4% Ca(OH)$_2$ | 25 | 168 | 0.3457 | 0.0113 | 28.2 |
| 27 | 0.04 | 16.8 | 4% Ca(OH)$_2$ | 25 | 168 | 0.3545 | 0.0116 | 29.0 |
| 28 | 0.04 | 16.8 | 4% Ca(OH)$_2$ | 25 | 168 | 0.3533 | 0.0116 | 28.9 |

151.64 g/mole=molecular weight of cationization reagent ("QUAB 151") (2,3-epoxypropyltrimethylammonium chloride)

%N×151.64 g/mole=correction factor for the increase in molecular mass for each substituted PVA molecular unit %N$_0$=baseline nitrogen content of the PVA Calculation of the theoretical DS:

$$\text{theor. } DS = \frac{n_{QUAB\,151}}{n_{PVA}}$$

n$_{QUAB}$151 = number of moles of cationization reagent QUAB 151 used n$_{PVA}$ = number of moles of dry polyvinyl alcohol.

The results obtained by the two methods of calculation differ, since the relationship between degree of substitution and nitrogen content of the cationic polyvinyl alcohol is not linear.

EXAMPLE 4

7,000 g PVA (6.6% humidity), Elvanol 71-30 and 52.3 g of a fine-particulate silicic acid are placed in a plowshare mixer and thereupon 392.3 g NaOH (50% solution) are sprayed on with 5 minutes' intensive mixing. Thereupon 2,556.3 g of 3-chloro-2-hydroxypropyl-trimethylammonium chloride (65.4% active, 32.3% H$_2$O) previously converted with 698.3 g NaOH (50% solution) into the corresponding epoxide are added and mixing then continues intensively for another 10 minutes. (Results in Table 4a.)

EXAMPLE 4a

Similarly to Example 4, 2,556.3 g of 3-chloro-2-hydroxypropyltrimethylammonium chloride are sprayed on a mixture of 7,000 g PVA (6.6% humidity), Elvanol 71-30, 52.3 g of silicic acid and 1,090.6 g NaOH (50% solution) and then are intensively mixed for 10 minutes. (Results are shown in Table 4a.)

TABLE 4a

Dry-cationization of PVA (Elvanol 71-30); DS$_{theor}$ = 0.060; water content = 17.1%; catalyst = 3% NaOH, oven-dry; reaction temp: 25° C.

| Test # | Time (t) | Nitrogen (%) | DS$_{practice}$ | yield (%) |
|---|---|---|---|---|
| 29 (Example 4) | 0.25 | 0.742 | 0.025 | 42.3 |
| | 1 | 0.768 | 0.026 | 43.9 |
| | 2 | 0.787 | 0.027 | 45.1 |
| 30 (Example 4a) | 0.25 | 0.738 | 0.025 | 42.0 |
| | 1 | 0.755 | 0.026 | 43.1 |
| | 2 | 0.766 | 0.026 | 43.8 |

Use of cationized PVA of the invention in the paper manufacturing process

The following raw materials are available for making a batch of paper:

Cellulose (36.37%, remainder water) of the following quality: 50% beechwood sulfite, 40% spruce sulfate and 10% spruce sulfite. The degree of grinding is 21° SR.

Standard China clay (dealuminized kaolin)

Auxiliaries: alum, polyethyleneimine, polyvinyl alcohol and cationized polyvinyl alcohol.

The raw materials identified above were used to prepare an approximately 3% suspension.

For this purpose 68.74 g of cellulose (=25 g dry cellulose), which had already been disintegrated with 1.5 L of water in a special beater apparatus for 3 minutes, was mixed with 3 L more water in the mixing vessel. Next 5 g of China clay, dispersed in ca. 200 mL of water, was added. This corresponds to a filler level of ca. 20%, based on the mass of paper solids. Next 9 g of a 10% alum was added. This produces a slightly acidic mix (Wochenblatt fur Papierfabri8kation, 10 (1978), pages 355-358). Depending on the calculated quantity of additive, between 0.5 and 1% of PVA paste (0.4% in water), based on the total of filler and cellulose, are added. The mix is made up to 10 L with water and kept in suspension by a stirrer operating at constant rpm. In order to form paper sheets with an area weight of 70-80 g/m$^2$, there was transferred 810 L of mix from the mixing vessel into the upright cylinder and 0.5 g of polyethyleneimine solution (1%) is added as a dewatering accelerator. A total of six of these cellulose slurry mixtures was made, which differ only in the nature and quantity of the added sizing agent, PVA or the cationic PVA prepared in accordance with the invention.

Mixture 1: 35.5 g PVA=0.5% of the mass

Mixture 2: 75.0 g PVA=1% of the mass

Mixture 3: 37.5 g of cationic PVA (DS=0.016)=0.5% of the mass

Mixture 4: 75.0 g of cationic PVA (DA=0.016)=1.0% of the mass

Mixture 5: 37.5 g of cationized PVA (DS=0.024)=0.5% of the mass

Mixture 6: 75 g of cationized PVA (DS=0.024)=1.0% of the mass (Mass=quantity of cellulose+filter charged).

Eight sheets were made from each mixture and tested. The strength testing of the predried sheets was carried out after equilibration at 47–53% atmospheric moisture and 21°–25° C. in an air-conditioned room.

Results

The use of 0.5 and 1% of cationized polyvinyl alcohol as sizing agent shows a distinct improvement in the bursting strength (compare mixtures 1 and 2 with mixtures 3 and 6 in Table 5). No unequivocal effect of the degree of cationization of the polyvinyl alcohol on the bursting strength can be perceived. Also, the tear strength determination suggest only that the use of more highly cationized polyvinyl alcohols leads to no worsening of the tear strength.

Retention experiments

The retention behavior was tested with the so-called Britt Dynamic Drainage Jar Test (DDJ Test) (the original Britt Jar, Paper Research Materials Co., New York 1982); K. W. Britt and J. E. Unbehend, TAPPI, 59 (2), 67 (1976); B Abson and D. F. Brooks, TAPPI, 59 (2), 67 (1976); B Abson and D. F. Brooks, TAPPI, 68 (1) 76 (1985). Depending on the quantity to be used, between 0.1 and 1% of native or cationic polyvinyl alcohol, based on the total of filler and solids, was added as a 0.4% paste. The results of this test are presented in Table 6 (the values indicated are each the average of three experiments).

TABLE 5

Strength testing of PVA-Sized Papers

| Mixture No. | PVA Additive | Area Weight m$_A$ in g/m$^2$ | Break Resistance F$_B$ in N | Tear Strength R in km | Burst Strength be in kPa m$^2$/g |
|---|---|---|---|---|---|
| 1 | 0.5% PVA (untreated) | 79.07 | 17.08 | 1.47 | 0.54 |

TABLE 5-continued

Strength testing of PVA-Sized Papers

| Mixture No. | PVA Additive | Area Weight $m_A$ in g/m² | Break Resistance $F_B$ in N | Tear Strength R in km | Burst Strength be in kPa m²/g |
|---|---|---|---|---|---|
| 2 | 1.0% PVA (untreated) | 77.63 | 15.92 | 1.39 | 0.64 |
| 3 | 0.5% cat. PVA (DS 0.016) | 75.59 | 13.1 | 1.18 | 0.65 |
| 4 | 1.0% cat. PVA (DS 0.016) | 77.71 | 15.26 | 1.34 | 0.69 |
| 5 | 0.5% cat. PVA (DS 0.024) | 75.11 | 14.64 | 1.33 | 0.59 |
| 6 | 1.0% cat. PVA (DS 0.024) | 80.48 | 16.56 | 1.40 | 0.68 |

TABLE 6

Results of Retention Experiments (See also Diagram No. 1)

| PVA Additive | Pract. DS | Dewatering Time g/100 ml filtrate | Filtrate Residue g/100 ml filtrate | Solids % |
|---|---|---|---|---|
| 0.1 | non- | 35.9 | 0.1633 | 100.99 |
| 0.3 | cation- | 36.1 | 0.1678 | 103.77 |
| 0.5 | ized | 35.9 | 0.1666 | 103.03 |
| 1.0 | PVA | 35.9 | 0.1668 | 103.15 |
| 0.1 | 0.016 | 36.7 | 0.0603 | 37.29 |
| 0.3 | 0.016 | 37.1 | 0.0341 | 21.09 |
| 0.5 | 0.016 | 37.1 | 0.0316 | 19.54 |
| 1.0 | 0.016 | 36.4 | 0.0256 | 15.83 |
| 0.1 | 0.024 | 36.8 | 0.0551 | 34.08 |
| 0.3 | 0.024 | 36.9 | 0.0248 | 15.34 |
| 0.5 | 0.024 | 37.1 | 0.0224 | 13.85 |
| 1.0 | 0.024 | 36.7 | 0.0243 | 15.03 |

The reference point is the quantity of solids contained in 100 ml of filtrate if there is no PVA additive (0.1617 g = 100%). The cationized polyvinyl alcohols used are derived from Experiments 17 (0.016) and 20 (0.024) of Table 3.

As the drawing unequivocally indicates, the solids content in the dewatering filtrate can be reduced by ca. 85% if 0.3 to 0.5% of cationized PVA is added to the paper slurry. In contrast, the addition of non-cationized PVA causes a slight increase in the solids content of the filtrate. No distinct effect on the dewatering time with the use of cationized PVA could be established. Thus, it is impossible to decrease the waste water burden in the paper manufacturing process.

Further variations and modifications of the invention will be apparent to those skilled in the art from the foregoing description and are intended to be encompassed by the claims appended hereto.

We claim:

1. A process for the direct preparation of cationized polyvinyl alcohol (PVA) in alkaline medium without intermediate steps comprising reacting an alkylidene halohydrin or mixtures thereof with an alkaline compound to convert halohydrin to the corresponding alkylidene epoxide or mixtures thereof and reacting the alkylidene epoxide or mixtures thereof with PVA in particulate, free-flowing form in the presence of water, said water being present in the amount of 11 to 30 weight %, based on the total amount of the reaction mixture, and in the presence of an alkaline compound selected from the group consisting of an alkali metal hydroxide, alkaline earth metal hydroxide and an alkaline earth metal oxide, the amount of alkaline compound being such that there is an excess of 1 to 4 weight %, based on the quantity of PVA, over the amount of alkaline compound required to completely convert the halohydrin to the corresponding expoxide.

2. The process in accordance with claim 1, comprising reacting in each instance at a temperature between 5° and 75° C.

3. The process in accordance with claim 1, wherein the alkylidene epoxide or mixtures thereof have the formulas:

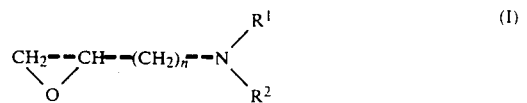

or

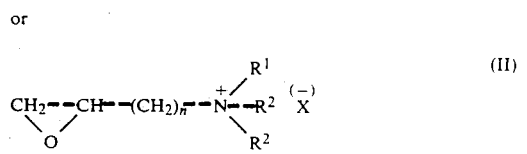

where n=1, 2, or 3, $R^1$, $R^2$ and $R^3$ denote the same or different alkyl residues having 1 to 18 carbon atoms and $X^-$ signifies chloride, bromide, sulfate or acetate.

4. The process in accordance with claim 1, wherein the alkaline compound is present in an excess of 2.5 to 3.1%.

5. The process in accordance with claim 2, wherein the temperature is from 15° to 45° C.

6. The process in accordance with claim 1, wherein PVA, alkaline compound, water and alkylidene epoxide are homogenized in an intensive mixing zone.

7. The process in accordance with claim 6, wherein the compounds are homogenized for 10 seconds to 25 minutes.

8. The process in accordance with claim 7, wherein the mixing takes place for 20 seconds to 5 minutes.

9. The process in accordance with claim 7, further comprising discharging the reaction mass after homogenizing and permitting the mass to react to completion.

10. The process in accordance with claim 1, further comprising adding to the reaction mixture 0.02 to 2.0 weight %, based on the total amount of the reaction mixture, of finely divided synthetically produced silica.

11. The process in accordance with claim 10, wherein the finely divided silica is selected from the group consisting of hydrophilic silica, hydrophobic silica and mixtures thereof.

12. The process in accordance with claim 3, further comprising adding to the reaction mixture 0.02 to 2.0 weight %, based on the total amount of the reaction mixture, of a finely divided synthetically produced silica.

13. The process in accordance with claim 6, wherein a plowshare mixer is used to provide the intensive mixing.

14. The process in accordance with claim 6, wherein a flow-through moistening mixer is used to provide the intensive mixing.

15. The process in accordance with claim 1, wherein the alkylidene epoxide or mixtures thereof have the formula:

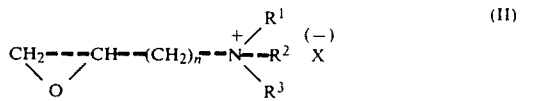

where n=1, 2, or 3, $R^1$, $R^2$ and $R^3$ denote the same or different alkyl residues having 1 to 18 carbon atoms and X signifies chloride, bromide, sulfate or acetate.

16. The process in accordance with claim 15, further comprising adding to the reaction mixture 0.02 to 2.0 weight %, based on the total amount of the reaction mixture, of a finely divided synthetically produced silica.

* * * * *